3,749,747
SUBSTITUTED CINNAMYL THIOCYANATES AND THEIR ISOMERS

Llewellyn W. Fancher, Orinda, Calif., assignor to Stauffer Chemical Company, New York, N.Y.
No Drawing. Filed May 12, 1970, Ser. No. 36,701
Int. Cl. C07c 161/02, 161/04
U.S. Cl. 260—454                              4 Claims

ABSTRACT OF THE DISCLOSURE

Compounds corresponding to the formula

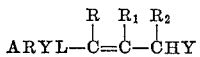

wherein ARYL is phenyl, substituted phenyl, naphthyl, and substituted naphthyl in which the substituents are halogen, nitro, and lower alkyl; R is independently hydrogen, or lower alkyl; $R_1$ is independently hydrogen, lower alkyl, or phenyl; $R_2$ is independently hydrogen, lower alkyl, and phenyl; with the provision that R, $R_1$, and $R_2$ are not simultaneously hydrogen when ARYL is phenyl; and Y is selected from the group consisting of —SCN and —NCS. The above-defined compounds are effective herbicides.

SUMMARY OF THE INVENTION

The invention relates to certain new compounds and their utility as active herbicidal substances. In particular, this invention pertains to certain novel materials having the general formula:

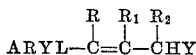

in which ARYL is selected from the group consisting of phenyl, naphthyl, substituted phenyl and substituted naphthyl in which the substituents are selected from the group consisting of halogen, nitro, and lower alkyl; R is selected from the group consisting of hydrogen and lower alkyl; $R_1$ is selected from the group consisting of hydrogen, lower alkyl and phenyl; and $R_2$ is selected from the group consisting of hydrogen, lower alkyl, and phenyl; with the provision and R, $R_1$, and $R_2$ are not simultaneously hydrogen when ARYL is phenyl; and Y is selected from the group consisting of —SCN and —NCS, and the use of these materials as herbicides.

Preferably, the compounds of the invention have the formula

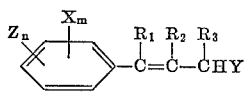

wherein X is selected from the group consisting of Cl, Br, and I; m is a whole number from 0 to 3; Z is —$NO_2$; n is a whole number from 0 to 2; $R_1$ is selected from the group consisting of hydrogen and alkyl containing 1 through 5 carbon atoms; $R_2$ is selected from the group consisting of hydrogen and alkyl containing 1 through 5 carbon atoms; $R_3$ is selected from the group consisting of hydrogen and alkyl containing 1 through 5 carbon atoms and phenyl, with the provision that $R_1$, $R_2$, and $R_3$ are not simultaneously hydrogen, when n and m are both zero; and Y is selected from the group consisting of —SCN and —NCS. In its most preferred form, the invention concerns compounds having the formula

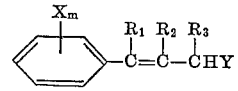

wherein X is selected from the group consisting of Cl, Br, and I; m is a whole number from 0 to 2; $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, ethyl, and phenyl; with the provision that $R_1$, $R_2$, and $R_3$ are not simultaneously hydrogen, when m is zero; and Y is selected from the group consisting of —SCN and —NCS; and the use of these compounds as herbicides.

The present invention also includes, as indicated, a method of controlling undesirable plants which comprises applying an effective amount of the above-described compounds to the plant or to a locus to be controlled or protected.

The compounds of the invention may be prepared by the following general reactions:

(1) 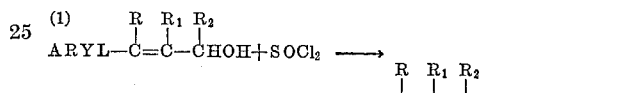

(2) 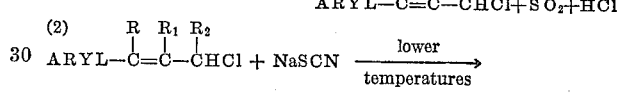

(3) 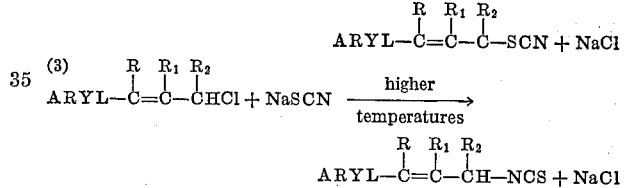

wherein ARYL, R, $R_1$, and $R_2$ are as above indicated.

The intermediate cinnamyl-type alcohols

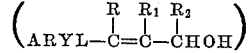

are easily prepared according to the method taught in U.S. Pat. No. 3,094,561. This method comprises generally the condensation of an appropriate arylaldehyde with acetaldehyde or other suitable aldehyde in the presence of potassium hydroxide an ethanol to yield a cinnamaldehyde-type compound. This aldehyde is then reduced with a reducing agent such as aluminum isopropoxide to form the cinnamyly alcohol type compound.

In general, lower temperature appear to favor reaction (2), while higher temperature appear to favor reaction (3). In some instances, as will be readily appreciated by those of skill in the art, mixtures will be obtained. Temperatures of reaction which favor the thiocyanate would appear to be in the range of about 5° C. to 25° C. while temperatures of from about 60° C. to 80° C. tend to favor the isothiocyanate. Where mixtures of product are obtained, they are readily separated by techniques known to those skilled in the art.

The reactions are preferably carried out in the liquid phase. The employment of a solvent is useful in facilitating processing as well as agitation of the reactants. Suitable solvents are benzene, chlorobenzene, toluene and the like.

As a consequence of the special geometry of the carbon-carbon double bond and restricted rotation about this bond, the possibility exists in the compounds of the present invention of geometric isomerism. Cis-trans isomerism is very frequently encountered in this type of structure containing a carbon-carbon double bond. It is recognized that the trans isomers are usually more stable than the corresponding cis isomers. The existence of both stereoisomeric forms is believed to exist for the majority of the compounds described herein. Thus, the compounds of the present invention are not limited to any specific geometric isomer configuration. The physical properties of cis and trans isomers are usually quite similar, and separation of both from a mixture by techniques such as fractional distillation or crystallization is not always possible.

In order to demonstrate the preparation of the compounds of the invention, the following examples are provided.

EXAMPLE 1

Preparation of 1,3-diphenyl-3-chloro-propene-1

Approximately 21 grams (0.1 M) of 1,3-diphenyl-3-hydroxy-propene-1 are dissolved in 40 cc. of $CHCl_3$, and 1.0 gram of triethylamine hydrochloride is added. About 13.1 grams (.11 M) of $SOCl_2$ in 20 ml. of $CHCl_3$ are then added, with stirring, over a 15 minute period. The temperature is maintained between 25° C. and 30° C. After stirring an additional hour, the reaction mixture is allowed to stand for about 12 hours. The mixture is then purged with air to remove HCl and $SOCl_2$. About 100 ml. of benzene is added, and the mixture is washed, until basic, with $NaHCO_3$, and then washed with $H_2O$. The product is then dried over $MgSO_4$, evaporated to give 1,3-diphenyl-3-chloro-propene-1. $N_D^{25}=1.6110$.

EXAMPLE 2

Preparation of 1,3-diphenyl-3-isothiocyanate-propene-1

About 19.9 grams (0.08 M) of 1,3-diphenyl-3-chloropropene-1, 100 ml. of acetone, and 10.5 g. (0.13 M) of NaSCN are mixed and refluxed for about an hour at a temperature of about 60° C. The reaction mixture is then evaporated to one-half volume, poured into cold water, and extracted with benzene. The extractant is then dried with $MgSO_4$, filtered, and evaporated with air on a steam bath to produce 1,3-diphenyl-3-isothiocyanate-propene-1. $N_D^{30}=1.6315$.

EXAMPLE 3

Preparation of 1-phenyl-2-methyl-3-thiocyanato-propene-1

The procedure is similar to that of Example 2, except that 1-phenyl-2-methyl-3-chloro-propene-1 is employed instead of the 1,3-diphenyl-3-chloro-propene-1, the temperature at initiation is less than 10° C., and the mixture is stirred for three hours at less than 5° C. A good yield of 1-phenyl-2-methyl-3-thiocyanato-propene-1 is obtained. $N_D^{30}=1.5635$.

EXAMPLE 4

Preparation of 1-(p-chlorophenyl)-2-methyl-3-thiocyanato-propene-1

The procedure is similar to that of Example 3, except that 1-p-chlorophenyl-2-methyl - 3 - chloro - propene - 1 is employed instead of 1 - phenyl - 2 - methyl - 3 - chloropropene-1.

EXAMPLE 5

Preparation of 1-(2,4-dichlorophenyl)-3-thiocyanato-propene-1

The procedure is similar to that of Example 3, except that 1-(2,4-dichlorophenyl)-3 - chloro-propene - 1 is employed instead of 1-phenyl-2-methyl-3-chloro-propene - 1. M.P. 85° C.–88° C.

EXAMPLE 6

Preparation of 1-(2-chlorophenyl)-3-isothiocyanato-propene-1

The procedure is similar to that of Example 2, except that 1-(2-chlorophenyl)-3-chloro-propene-1 is employed instead of 1,3-diphenyl-3-chloro-propene-1. $N_D^{30}=1.6098$.

EXAMPLE 7

Preparation of 1-1-naphthyl-3-methyl-3-thiocyanato-propene-1

The procedure is similar to that of Example 3, except that 1-1-naphthyl-3-methyl - 3 - chloro - propene is employed instead of 1-phenyl-2-methyl-3-chloro-propene-1.

EXAMPLE 8

Preparation of 1-(2-nitrophenyl)3-isocyanato-propene-1

The procedure employed is similar to that in Example 2, except that 1-(2-nitrophenyl)-3-chloro-propene-1 is employed instead of the 1,3-diphenyl-3-chloro-propene-1.

Compounds which may be produced according to the invention include:

(1) 1,3-diphenyl-3-isothiocyanato-propene-1
(2) 1,2-diphenyl-3-thiocyanato-propene-1
(3) 1-(2,4-dichlorophenyl)-3-isothiocyanato-propene-1
(4) 1-(2,4-dichlorophenyl)-3-thiocyanato-propene-1
(5) 1-(2-chlorophenyl)-3-thiocyanato-propene-1
(6) 1-phenyl-2-methyl-3-isothiocyanato-propene-1
(7) 1-(2-methylphenyl)-3-thiocyanato-propene-1
(8) 1-phenyl-3-ethyl-3-thiocyanato-propene-1
(9) 1-(1-naphthyl)-3-thiocyanato-propene-1
(10) 1-(1-naphthyl)-3-methyl-3-isothiocyanato-propene-1
(11) 1-(2-bromophenyl)-3-ethyl-3-isothiocyanato-propene-1
(12) 1-(4-chlorophenyl)-3-thiocyanato-propene-1
(13) 1-(3-chlorophenyl)-3-thiocyanato-propene-1
(14) 1-(2-chlorophenyl)-3-isothiocyanato-propene-1
(15) 1-phenyl-2-methyl-3-thiocyanato-propene-1
(16) 1(2-nitrophenyl)-3-isothiocyanato-propene-1

As previously indicated, the compositions of the invention are phytotoxic compounds which are useful and valuable in controlling various plant species. The compounds designated as 3, 5, and 15 in the table were tested as herbicides in the following manner.

Seeds of four species including crabgrass, mustard, curled dock, and one crop pinto beans (*Phaseolus vulgaris*) are planted about one-half inch deep in sandy loam soil in individual rows in flats. Enough seeds are planted to give 30 to 50 plants of each species per flat, and the flats are watered after planting. The flats are placed in the greenhouse at 50° to 85° F. and watered daily with a sprinkler. About 10 to 14 days after planting when the primary leaves of the bean plant are almost fully expanded and the first trifoliate leaves are just starting to form, the plants are sprayed. The spray is prepared by weighing out about 50 mg. of the test compound, dissolving it in 15 ml. of acetone containing about 1 percent Tween® (polyoxyethylene monolaurate), and then adding 5 ml. of water. The solution is sprayed on the foliage using an atomizer. The spray concentration is about 0.5% and the rate would be approximately 20 lb./acre if all of the spray was retained on the plant and soil. However, since some spray is lost, it is estimated that the actual application rate is approximately 12.5 lb./acre.

The treated plants are placed back in the greenhouse and care is taken to avoid sprinkling the treated foliage with water for three days after treatment. Water is applied to the soil by means of a slow stream from watering hose. Injury rates are recorded 14 days after treatment. A rating of 0 to 10 is given based on estimated injury or kill. The results of this test are reported in Table II.

TABLE II
Rate 20 lbs./acre

| Compound number | Crabgress (Digitaris sanguinalis) | Mustard (Brassica juncea) | Curled dock (Rumex crispus) | Pinto bean (Phaseolus vulgaris) |
|---|---|---|---|---|
| 3 | 9 | 9 | 6 | 9 |
| 5 | 9 | 9 | 9 | 9 |
| 15 | 9 | 9 | 3 | 9 |

As can be seen by the test results, the compounds of the invention are useful as herbicides. The compounds may be applied directly to the particular undesired plant species or may be applied to a locus to be protected. In either event, it is, of course, necessary that the unwanted species receive an effective dosage of amount, i.e., an amount sufficient to kill or retard growth.

The compounds are normally employed with a suitable carrier and may be applied as a dust, spray, drench or aerosol. The compounds thus may be applied in combination with solvents, diluents, various surface active agents (for example, detergents, soaps, or other emulsifying or wetting agents, surface active clays) carrier media, adhesives, spreading agents, humectants, and the like. They may also be combined with other biologically active compositions, including other herbicides, fungicides, bactericides, and algaecides, insecticides, growth stimulators, acaricides, molluscicides, etc., as well as with fertilizers, soil modifiers, etc. The compounds of the invention may be used in combination with an inert carrier and a surface active or emulsifying agent and may also be applied in combination with other biologically active materials, in conjunction with a carrier and a surface active or emulsifying agent. The solid and liquid formulations can be prepared by any of the conventional methods well-known to those skilled in the art. Determination of the optimum effective concentration for a specific application is readily conducted by routine procedures, as will be apparent to those skilled in the art. As indicated, the amount applied in a given case will be an effective amount, i.e., an amount sufficient to give the type of control desired.

What is claimed is:
1. A compound having the formula

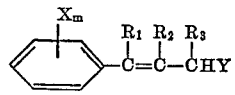

wherein X is selected from the group consisting of Cl, Br, and I; $m$ is a whole number from 0 to 2; $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, ethyl, and phenyl, with the provision that $R_1$, $R_2$, and $R_3$ are not simultaneously hydrogen when $m$ is zero; and Y is selected from the group consisting of —SCN and —NCS.

2. The compound of claim 1 wherein $m$ is 0, R is hydrogen, $R_1$ is methyl, $R_2$ is hydrogen, and Y is —SCN.

3. 1-(2-chlorophenyl)-3-thiocyanato-propene-1.

4. 1-(2,4-dichlorophenyl)-3-isothiocyanato-propene-1.

References Cited
UNITED STATES PATENTS

| 3,553,243 | 1/1971 | Hein et al. | 71—104 |
| 3,244,740 | 4/1966 | Lukes | 424—302 |

FOREIGN PATENTS

| 160,160 | 9/1951 | Australia | 71—104 |
| 1,471,952 | 1/1967 | France | 71—104 |

OTHER REFERENCES

Smith et al.: "The Isomerization of alkyl thiocyanates, etc." (1960), JACS 82, pp. 3076–82 (1960).

Dombrovskii et al. "Haloarylation of usat. compds., etc." (1956), CA 51, p. 7337 (1957).

ELBERT L. ROBERTS, Primary Examiner
G. HOLLRAH, Assistant Examiner

U.S. Cl. X.R.
71—104

UNITED STATES PATENT OFFICE
CERTIFICATE OF CORRECTION

Patent No. 3,749,747  Dated July 31, 1973

Inventor(s) Llewellyn W. Fancher

It is certified that error appears in the above-identified patent and that said Letters Patent are hereby corrected as shown below:

Column 2, line 49, "potassium hydroxide and ethanol" should read -- potassium hydroxide and ethanol --; line 53, "to form the cinnamyly alcohol" should read -- to form the cinnamyl alcohol --. Column 3, line 6, "Cis-trans isomerism" should read -- *Cis-trans isomerism* --; line 9, "trans isomers" should read -- *trans* isomers --; line 10, "cis isomers" should read -- *cis* isomers --; line 15, "cis and trans isomers" should read -- *cis* and *trans* isomers --. Column 4, line 73, the portion of the line reading "by means of a slow stream from watering" should read -- by means of a slow stream from a watering --.

Signed and sealed this 24th day of September 1974.

(SEAL)
Attest:

McCOY M. GIBSON JR.
Attesting Officer

C. MARSHALL DANN
Commissioner of Patents